Figure 1:
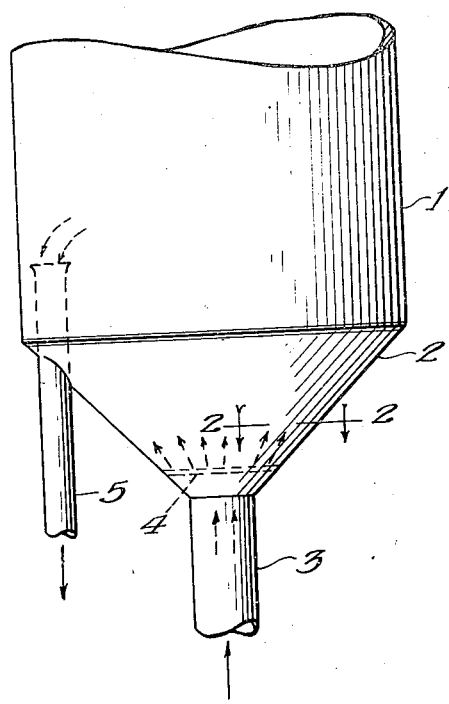

Nov. 15, 1949  H. RODMAN  2,487,984
FLUID DISTRIBUTING PLATE
Filed Oct. 31, 1945

Inventor:
Hugh Rodman
By: Maynard P. Venema
Attorney

Patented Nov. 15, 1949

2,487,984

UNITED STATES PATENT OFFICE 2,487,984

FLUID DISTRIBUTING PLATE

Hugh Rodman, Chicago, Ill., assignor to Universal Oil Products Company, Chicago, Ill., a corporation of Delaware Application October 31, 1945, Serial No. 625,851

5 Claims. (Cl. 23—288)

This invention relates to an improved type of flow distribution plate, or more specifically to an improved form of perforated distribution grid which will operate to reduce the velocity of a charge stream flowing therethrough, as well as distribute the fluid stream uniformly across the diameter of the vessel being charged.

Various well known hydrocarbon conversion processes such as catalytic cracking, catalytic dehydrogenation, catalytic aromatization, etc., make use of finely divided solid particles to catalytically promote conversion reactions. In fluid processes of this type, the conversion of the fluid reactants and the regeneration of the contaminated catalyst particles is accomplished continuously in separately confined reaction and regenerating vessels between and through which catalyst is continuously passed in series. The mass of catalyst undergoing regeneration in the regenerating vessel is maintained in the form of a fluid-like bed of subdivided solid catalyst particles. Fluidization of the bed is accomplished by passing the oxidizing gas employed to burn combustible contaminants from the catalyst and the resulting hot combustion gases upwardly through the bed at a velocity which partially counteracts the force of gravity on the catalyst particles and causes hindered settling of the latter. A mass of catalyst being employed to promote the conversion reaction in the reaction vessel may also be maintained in a similar fluid-like condition by passing the fluid reactants and the resulting fluid conversion products upwardly through the bed at a velocity controlled to keep the latter in a relatively dense fluid-like condition. A perforated distribution plate is normally employed at the lower end of each of the vessels to obtain uniform distribution of the charge streams to each of the beds to be maintained in a fluidized condition.

It is an object of this invention to provide an improved form of perforated grid plate which effects uniform distribution and diffusion of a fluidized charge stream while permitting greater use of the lower portion of a contacting chamber.

Another object of the invention is to provide an improved form of grid which reduces the velocity and the kinetic energy of a fluid stream and entrained solid particles which may be carried by the flow stream.

A further object of the invention is to provide a grid plate which prevents transverse movement or recirculation of fluid material and entrained solid particles at the inlet face of the grid plate.

At present, in commercial fluid catalyst conversion units, of the type mentioned above, both the reactor and regeneration vessels normally have a perforated grid plate to distribute the respective incoming fluidized stream across the area of the vessel and this plate is usually placed at the tangent line between the lower inlet cone and the cylindrical body of the chamber itself. However, it has been found that with the present distribution plates, having straight-through perforated holes at spaced points on the plate, the fluid stream and catalyst particles pass through the grid at too great a velocity when the grid is positioned at a point just above the inlet conduit. Also, that a portion of the catalyst particles being carried in the gas stream impinge against the flat bottom of the plate and travel horizontally until reaching a hole in order to pass upwardly through the grid plate. In addition, it has been found that a considerable portion of the catalyst particles fall back against the bottom inlet cone of the vessel and must be recirculated by the fluid stream entering the inlet conduit such that an undesirable condition results under the grid plate. With the present types of grid plate, a tapered inlet cone for the chamber, is of course necessary, to reduce the velocity of the charge stream, while the placing of the grid plate across the junction of the cone and the cylindrical portion of the chamber serves to distribute the charge stream across the full area of the chamber.

The improved form of distribution plate comprising this invention has an inlet surface or upstream side which comprises a plurality of closely positioned and tapered inlets each of which lead to a small sloping or diagonally placed hole that passes through the plate to the outlet side. The small holes are arranged in groups of three and sloped so that each of the streams of a given group will be directed to converge together at a common point. This arrangement results in a net movement of the fluid material from the grid plate at a lower velocity and a greatly reduced kinetic energy. The outlet surface of the distribution plate is preferably provided with a plurality of concave or dished indentations, each accommodating a group of three of the small holes. Each hole thus passes through the plate to terminate within a dished indentation which is formed to provide a surface approximately normal to the axis of each of the small holes.

One of the principal advantages of the improved perforated distribution plate of this type is the velocity and kinetic energy reducing feature which permits the placing of the plate lower within the inlet cone of the vessel, at a point just above the inlet conduit, thus allowing utilization of the cone itself for contacting and conversion purposes. Another feature of the distribution plate which is very desirable is the fact that the improved grid may be made much smaller and thereby eliminate much of the structural support that is required for the large present types of grid plates which extend across the whole cross-sectional area of the vessel. A still further advantage lies in the fact that the inlet surface of the plate has no flat surfaces for solid particles to impinge against, it being provided with a multiplicity of tapered openings each of which will pass a flow stream of solid particles directly through the plate.

The construction of the distribution grid plate as well as the advantageous operating features will be made more apparent upon reference to the accompanying drawing.

Figure 1 of the drawing shows an elevational view of a portion of a contact chamber employing a fluid distribution grid of the improved type comprising this invention.

Figure 2:
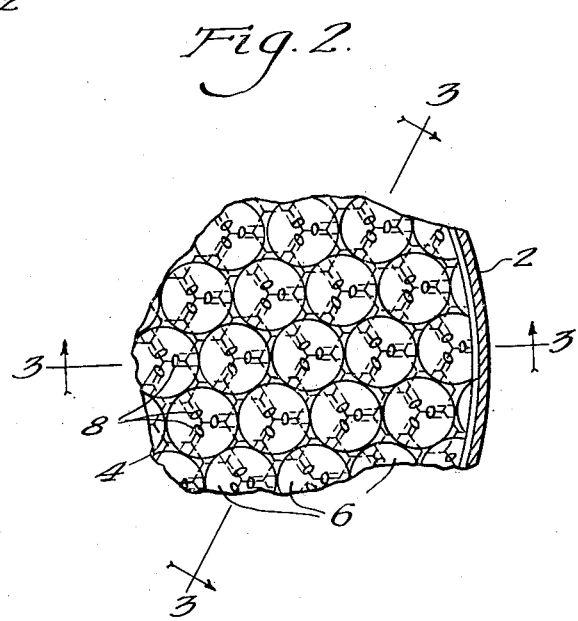

Figure 2 of the drawing shows a plan view of a small portion of the improved grid plate as indicated by the line 2—2 in Figure 1.

Figure 3:
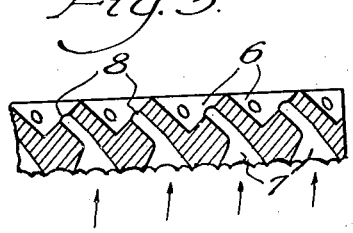

Figure 3 of the drawing shows a sectional view through a portion of the grid as indicated by the lines 3—3 in Figure 2.

Referring now to Figure 1 of the drawing, the numeral 1 designates a cylindrically shaped chamber, having a conical bottom head 2. The chamber being of a type that may be employed for chemical or catalytic conversion reactions where small subdivided solid particles are contacted by a vaporous or gaseous stream within the chamber. A fluidized stream of particles is charged to the chamber 1 by way of inlet riser or conduit 3, and distributed and diffused by distribution plate 4 into a turbulent fluidized bed within the chamber 1. The fluidized bed results from the action of the fluid medium passing through the improved perforated plate 4. Reaction or conversion products resulting from the contact are withdrawn through suitable means at the upper end of the chamber (not shown), while contacted solid particles are withdrawn by way of the outlet standpipe 5.

Figure 2 of the drawing shows a small portion of the improved distribution plate 4 which, in the particular chamber shown in Figure 1, is placed just above the inlet line 3 within the lower portion of cone 2. As previously noted, Figure 3 of the drawing shows a sectional view through a portion of the plate as designated by the lines 3—3 in Figure 2. The upper surface or outlet side of the plate 4 is provided with a plurality of cone-like depressions 6 which are circular and adjoin one another tangentially, such that their centers are equidistant one from the other in an equilateral triangular pattern. The lower surface of the grid plate, or more specifically the inlet side of the plate is provided with a plurality of indentations or tapered inlet openings 7. These tapered indentations 7 are preferably conical and adjoin one another with their centers also on equilateral triangular spacing as above; however, for each of the openings 6 there are three of the tapered conical inlets 7. These smaller conical or tapered inlets 7 are so placed that adjoining openings encroach to a slight extent one upon another, and thereby result in the elimination of any flat surfaces on the lower side of the plate 4. As noted in Figure 2, the circular or conical depressions 6 when ad-joining tangentially leave a triangular like fillet of flat plate between the indentations. In the improved form of distribution plate, the construction is such that on the lower or inlet side, the fillets of flat plate are reduced to the size of a point, and in plan view the surface of the plate appears as a plurality of hexagons adjoining one another in staggered relationship. The advantage of this, as pointed out previously, is that the surface is entirely sloping and does not offer any flat surfaces to resist fluid flow or be impinged by solid particles in the flow stream.

A small slanting opening or hole 8 connects each conical inlet 7 with the upper surface of the plate 4 and each discharges on the outlet side through depressions 6, which provide surfaces normal to the axis of holes 8. Of special importance is the particular manner of placing and orienting the respective upper and lower depressions 6 and 7 and the sloped openings 8, so that groups of three of the holes 8 will discharge into each outlet depression 6 and the discharge streams will meet or converge at a common point beyond the indentation 6. Thus, the kinetic energy of the fluid stream entering the chamber by way of conduit 3 is substantially reduced. The fluid medium and entrained particles are substantially reduced in velocity and given a change in direction as they pass through the various holes 8. As the various streams entering inlets 7 impinge against each other in sets of three, as provided by the distribution plate, there is a considerable loss in kinetic energy of the particle stream and the resultant effect is a reduced upward movement of the mass in a diffused and evenly distributed manner.

Another advantage in the improved construction of the plate 4 and the manner of positioning the holes 8 is that only one or two of the sloping holes 8 need be brought through the plate 4 into the outermost depressed openings 6 around the periphery of the grid plate. Thus, portions of the flow stream may be directed at an angle upwardly along the inside of the tapered cone 2 and serve to prevent settling of finely divided solids at this point.

The perforated distribution plate comprising this invention, as has been noted, is particularly useful in connection with distribution of fluidized solid particle streams in catalytic conversion processes; however, the plate may be equally useful for diffusion purposes or for distributing flow streams in other processes.

Variations in the construction of the plate itself may be the upper and lower tapered indentations 6 and 7 may be conical as shown, or they may be made dished, parabolic, or the like. Also, it is not intended to restrict the invention as to composition or to the method of fabrication. The plate may be cast or drilled and formed from any desired material which is suitable for the operating conditions to be encountered.

I claim as my invention:

1. A perforated fluid distribution plate having a plurality of sloped openings passing therethrough, a plurality of inlet indentations on one side of said plate connecting with said openings, a plurality of outlet indentations on the opposite side of said plate, said indentations on each side being circular in cross-section and adjoining one another tangentially so that their centers are equidistant one from the other in an equilateral triangular pattern and said sloped openings oriented in groups of three with each one of a group terminating in a single outlet indentation.

2. A perforated fluid distribution plate having an inlet side and an outlet side, a plurality of sloped openings passing through said plate, a plurality of tapered inlet indentations on said inlet side connecting to said sloped openings, a plurality of outlet indentations on said outlet side, said indentations on each of said sides being circular in cross-section and adjoining one another tangentially so that their centers are equidistant one from the other in an equilateral triangular pattern, said plate having three of said inlet indentations for each of said outlet indentations and said sloped openings oriented in groups of three terminating in an outlet indentation common to one group.

3. A perforated fluid distribution plate having an inlet side and an outlet side, a plurality of sloped openings passing therethrough, a plurality of tapered inlet indentations on said inlet side connecting with said openings, a plurality of conically tapered outlet indentations on said outlet side, said plate having three of said inlet indentations for each of said outlet indentations, said indentations on each of said sides being circular in cross-section and adjoining one another tangentially so that their centers are equidistant one from the other in an equilateral triangular pattern, said sloped openings oriented in groups of three openings with each opening of one of said groups terminating in a common outlet indentation and each directed to converge at a common point beyond said outlet indentation.

4. A perforated fluid distribution plate having an inlet side and an outlet side, a plurality of sloped openings passing therethrough, a plurality of conically tapered inlets on said inlet side connecting with said openings, a plurality of conically tapered outlets on said outlet side, said plate having three of said conically tapered inlets for each of said tapered outlets, said conically tapered inlets and outlets on each of said sides being circular in cross-section and adjoining one another tangentially so that their centers are equidistant one from the other in an equilateral triangular pattern, said sloped openings oriented in groups of three openings, with each opening of one of said groups terminating in a common conically tapered outlet and each opening of a said group directed to converge at a common point beyond said tapered outlet.

5. A perforated fluid distribution plate as described in claim 4 further characterized in the provision of point-like projections between the adjacent conically tapered inlets.

HUGH RODMAN.

No references cited.